United States Patent [19]
Reichelt et al.

[11] Patent Number: 6,154,970
[45] Date of Patent: Dec. 5, 2000

[54] METHOD OF SENSING THE AXLE GEOMETRY ON MOTOR VEHICLES WITH INDEPENDENT WHEEL SUSPENSIONS

[75] Inventors: Helmut Reichelt, Denkendorf; Karlheinz Schwegler, Stuttgart; Ludger Willenbrink, Remseck, all of Germany

[73] Assignee: DaimlerChrysler AG, Stuttgart, Germany

[21] Appl. No.: 09/258,887

[22] Filed: Mar. 1, 1999

Related U.S. Application Data

[63] Continuation of application No. PCT/EP97/04458, Aug. 14, 1997.

[30] Foreign Application Priority Data

Aug. 27, 1996 [DE] Germany .......................... 196 34 505

[51] Int. Cl.⁷ .................................................. G01B 5/255
[52] U.S. Cl. ............................ 33/203.18; 33/203; 33/335
[58] Field of Search .................................. 33/203.18, 1 N, 33/203, 203.2, 203.21, 534, 600, 335, 336, 337, 370, 371

[56] References Cited

U.S. PATENT DOCUMENTS

| | | | |
|---|---|---|---|
| Re. 33,302 | 8/1990 | Mason .................................. | 33/203.18 |
| 4,029,337 | 6/1977 | Bishop ................................ | 33/203.18 |
| 4,443,951 | 4/1984 | Elsasser et al. ...................... | 33/203.13 |
| 4,942,666 | 7/1990 | Wickmann et al. ................. | 33/203.18 |
| 5,208,646 | 5/1993 | Rogers et al. ......................... | 356/152 |
| 5,767,767 | 6/1998 | Lima et al. ........................... | 33/203.18 |

FOREIGN PATENT DOCUMENTS

| | | |
|---|---|---|
| 2 487 065 | 1/1982 | France . |
| 2 695 996 | 3/1994 | France . |
| 61-205813 | of 1986 | Japan . |

OTHER PUBLICATIONS

Quotation on Two Chassis Stands to Mercedes Benz AG dated Dec. 7, 1990.
Purchase Order from Mercedes Benz AG dated Apr. 19, 1991.
Acceptance Report dated Dec. 18, 1991.
DE 690 00885 T2.
Opposition dated Feb. 18, 1998.
Response to Opposition Jun. 29, 1998.

*Primary Examiner*—Christopher W. Fulton
*Attorney, Agent, or Firm*—Evenson, McKeown, Edwards & Lenahan, P.L.L.C.

[57] ABSTRACT

A method of sensing the axle geometry, in particular the toe-in, camber and caster, on motor vehicles with independent wheel suspensions. The inclination of certain links of the wheel suspensions is measured in at least one arbitrary motor-vehicle position, or the inclination measurements are carried out in the case of certain links of the wheel suspensions and one specific location of the vehicle body in at least one arbitrary motor-vehicle position. The measured values sensed are sent via a data line or wirelessly to a computer and either compared with vehicle-type-specific setpoint values or setpoint value ranges adapted in the computer to the currently applicable motor-vehicle position or are converted in the computer to a neutral motor-vehicle position and compared with the vehicle-type-specific setpoint values or setpoint value ranges based on a neutral motor-vehicle position. With the aid of the deviations between the measured values and the corresponding setpoint values or setpoint value ranges determined during comparison, a measuring or checking record of the axle geometry and/or a set of machine-processable alignment data is produced.

16 Claims, 1 Drawing Sheet

METHOD OF SENSING THE AXLE GEOMETRY ON MOTOR VEHICLES WITH INDEPENDENT WHEEL SUSPENSIONS

CROSS-REFERENCE TO RELATED APPLICATIONS

This application is a continuation under 35 U.S.C. 111(a) of pending international PCT Application No. PCT/EP97/04458, filed Aug. 14, 1997, and claims the priority of German application number 196 34 505.7, filed on Aug. 27, 1996, the disclosures of which are incorporated by reference herein.

BACKGROUND AND SUMMARY OF THE INVENTION

The invention relates to a method of sensing the axle geometry, in particular the toe-in, camber and caster, on motor vehicles with independent wheel suspensions.

To ensure the desired handling characteristics and straight-running ability and to prevent excessive tire wear, vehicle manufacturers prescribe specific axle alignment values, including the permissible tolerances for the vehicle axles of their models. For example, the toe-in can be set by means of the steering track rods and/or the camber and caster angles can be set by means of an eccentric. The other axle alignment values for the steering-axis inclination, the king-pin offset, the castor offset and the toe difference angle are design data which cannot easily be measured and are used only to allow a motor vehicle which has been damaged in an accident or used for a considerable time to be checked for road safety.

Since the axle alignment values or the axle geometry are dependent on loading and load distribution, checking or measuring is carried out on the unloaded, horizontally standing motor vehicle. For a motor vehicle in this neutral position, the axle alignment values are prescribed.

They can be verified by measurement or be checked, in order then, if need be, to be set or readjusted.

Three methods are known in this respect, inter alia from German patent document DE 41 34 411 A1, U.S. Pat. No. 5,056,233, and German patent document DE 43 43 624 A1. The first-mentioned document discloses a method in which specific angular positions of a motor-vehicle wheel and vertical distances of a body part from the center of the wheel are measured in addition to the associated wheel position. The measured values are set in relation to one another for determining a dependence of the wheel position on the level thus determined. The second-mentioned document discloses a method in which the inclinations of the wheels with respect to one another are determined with the aid of sensors applied to the wheel rims in order to calculate corrective values from this. In the third-mentioned document, a method which is concerned, inter alia, with the evaluation of link and wheel inclination is presented. Here too, sensors for inclination sensing are arranged on all the wheel rims.

Furthermore, French patent document FR-A-2 695 996 discloses a wheel alignment system in which, inter alia, the wheel camber, the steering-axis inclination, the caster and the toe-in are measured. In the case of this system as well, inclination-measuring devices are applied to the wheels or links of the vehicle on which measurements are to be carried out. For this purpose, the vehicle is either in a position comparable to the design position or, for individual measurements, is even jacked up into an exactly aligned state.

Therefore, meaningful measuring or checking of the axle geometry is dependent on proper alignment and loading or unloading. If, for example, the motor vehicle is out of the neutral position, for example due to differing compression or rebound of individual wheels, owing inter alia to incorrect loading, the factory-prescribed axle alignment values, based on the neutral position, do not coincide with the measured values sensed, even if the axle geometry is correctly set. In this case there is the risk of a correct axle geometry being maladjusted or of a setting which should be corrected not being correctly adjusted.

The invention is based on the problem of developing a method with which the axle geometry can be measured and/or checked with simple means independently of the level position of the motor vehicle. The recordable result of the measurement and/or check should be suitable for also permitting automatic adjustment or setting.

The problem is solved by providing a method of sensing the axle geometry, in particular the toe-in, camber and caster, on motor vehicles with independent wheel suspensions, the measured values sensed by measuring techniques being sent via a data line or wirelessly to a computer, wherein the inclination is measured in the case of certain links of the wheel suspensions independently of the level position of the motor vehicle, or wherein the inclination measurements are carried out in the case of certain links of the wheel suspensions and one specific location of the vehicle body independently of the level position of the motor vehicle, wherein the measured values are compared with vehicle-type-specific setpoint values or setpoint value ranges adapted in the computer to the currently applicable motor-vehicle position or wherein the measured values are converted in the computer to a neutral motor-vehicle position and compared with the vehicle-type-specific setpoint values or setpoint value ranges based on a neutral motor-vehicle position and wherein, with the aid of the deviations between the measured values and the corresponding setpoint values or setpoint value ranges determined during comparison, a measuring or checking record of the axle geometry and/or a set of machine-processable alignment data is produced.

The problem is solved by providing a method of sensing an axle geometry of a motor vehicle with independent wheel suspensions, comprising the steps of: measuring values of inclination of a plurality of links of the wheel suspensions independently of a level position of the motor vehicle; comparing said inclination values with vehicle-type-specific setpoint values or setpoint value ranges to determine deviations therebetween; and determining alignment correction values for said axle geometry based on said deviations.

According to the method of the invention, the inclination is measured in the case of certain links of the wheel suspensions in at least one arbitrary motor-vehicle position, or the inclination measurements are carried out in the case of certain links of the wheel suspensions and one specific location of the vehicle body in at least one arbitrary motor-vehicle position. The measured values sensed are sent, for example via a data line, to a computer and either compared with vehicle-type-specific setpoint values or setpoint value ranges adapted in the computer to the currently applicable motor-vehicle position or are converted in the computer to a neutral motor-vehicle position and compared with the vehicle-type-specific setpoint values or setpoint value ranges based on a neutral motor-vehicle position. With the aid of the deviations between the measured values and the corresponding setpoint values or setpoint value ranges determined during comparison, a measuring or checking record of the axle geometry and/or a set of machine-processable alignment data is produced.

The inclination measurements are taken with the aid of an electronic inclination-measuring device. The measuring device comprises a sensor which is integrated in a housing and indicates a measured deviation from the horizontal or vertical in angular degrees. The sensor part has, for example, a measured-value range of +/−15° and a measuring accuracy of 0.01 to 0.05°.

As the sensor and/or sensor system, any physical principle which allows the said measuring range and the specified measuring accuracy can be used for the inclination-measuring device. The sensors may be, inter alia, magnetoresistive, conductometric, piezoelectric or optical sensors.

The sensor is accommodated in a housing which has on its outer contour various adapter surfaces and/or adapter contours. A device for indicating the measured value may be accommodated spatially separately from the sensor in a separate housing. Depending on the measuring principle, the sensors, including their housings, may be just a few cubic centimetres in size, with the result that the bearing surfaces or bearing contours on the object to be measured only have to be just a few square millimetres in size. It is contemplated to design the housing of the sensor as a truncated pyramid, a cone, a stepped bolt or the like, which is to be inserted for example at the links of the motor vehicle into recesses provided there, corresponding to the shape of the sensor housing, for the inclination measurement.

In the case of larger sensors or sensor systems, adapter elements are generally made to suffice for the differing adaptation of the sensor housing to the object to be measured. The adapter elements are, for example, hooks, brackets, clips and the like. They are shaped such that they allow the inclination-measuring device a definite bearing contact on or against at least one link at a specific location in each case.

The angle of inclination determined by the sensor is presented or output optically or acoustically on an indicating device. The indicating device is arranged on the sensor housing, in the vicinity thereof, or is connected to the sensor housing via a line. As a result, the person operating the inclination-measuring device can check the plausibility of the measurement in situ on the basis of the output angle of inclination and, if need be, can repeat the measurement. In the housing of the indicating device there are also the electronic subassemblies for converting the measuring signals into measured values which can be optically and/or acoustically presented.

It goes without saying that the inclination-measuring device may also have an input, storage and computing unit, with the result that the individual vehicle-type-specific checking or measuring operations can be called up by pressing a button.

For measuring or checking the axle geometry, the motor vehicle is driven over a pit or is jacked up, with the result that the wheel-controlling and wheel-carrying links are accessible. The motor vehicle does not have to be unloaded beforehand, nor is it necessary to inflate the tires to the correct pressure or observe a correct size of tire and/or rim. It is also not necessary for the motor vehicle to be horizontally aligned over the pit or on the lifting platform.

For sensing the measured values, the inclination-measuring device is adapted to the various links of the motor vehicle, a measured value is determined and is transmitted to a downstream computer. In this way, measurements can be carried out on one link after the other with one inclination-measuring device. With a plurality of inclination-measuring devices, measurements can also be carried out on a group of links, for example the links of one wheel suspension, or on all the links simultaneously. In the latter case, an operator adapts the inclination-measuring devices at all the links relevant for the axle geometry measurement and then starts the measurement from a central location.

In addition, the body of the motor vehicle on which measurements are to be carried out can be inclined in various directions during the measuring operation or between individual measurements, with the result that the position of the wheels changes with respect to the body. From the changes in inclination of the links during a compression or rebound of the wheels, it is possible to determine, inter alia, further axle geometry values or establish irregularities in the kinematic and elastokinematic behavior of the wheel suspension.

Furthermore, there is the possibility of measuring the individual link inclination in its relationship to the body inclination. This allows, inter alia, the upper and lower ends of the spring deflection of an individual wheel suspension to be determined.

The measured values sensed are sent by data line or wirelessly, for example by radio, to a computer. The vehicle-type-specific data on the chassis are made available to the computer, for example a PC (personal computer). On the basis of the inclinations of the various links of a wheel suspension, the vehicle-type-specific data and the corresponding transmission formulae, it is possible to calculate, for example, the level of this wheel suspension. The level is in this case the compression or rebound deflection with respect to a zero or neutral position of the wheel or the wheel suspension.

With the aid of the level of one wheel, if need be also of an axle, it is possible to calculate, for example, level-dependent characteristic axle values such as camber, castor or toe difference angle. The vehicle-type-specific data or formulae necessary for the level calculation may also be generated by experimentally determined data or sets of data.

The currently applicable characteristic axle values calculated using the link inclinations are compared in the computer with the setpoint values or setpoint value ranges prescribed by the vehicle manufacturer. The results of the comparison or comparisons are recorded by the computer, for example by means of a printer. If one or more characteristic axle values lie outside the corresponding setpoint value ranges, machine-processable corrective suggestions are output, if need be, with the record via a corresponding computer interface. These corrective suggestions or the setting or adjusting requests may be carried out by machine at the manufacturer's factory and/or the repair workshops by means of suitable devices.

Other objects, advantages and novel features of the present invention will become apparent from the following detailed description of the invention when considered in conjunction with the accompanying drawings.

DETAILED DESCRIPTION OF THE DRAWINGS

Figure 1:
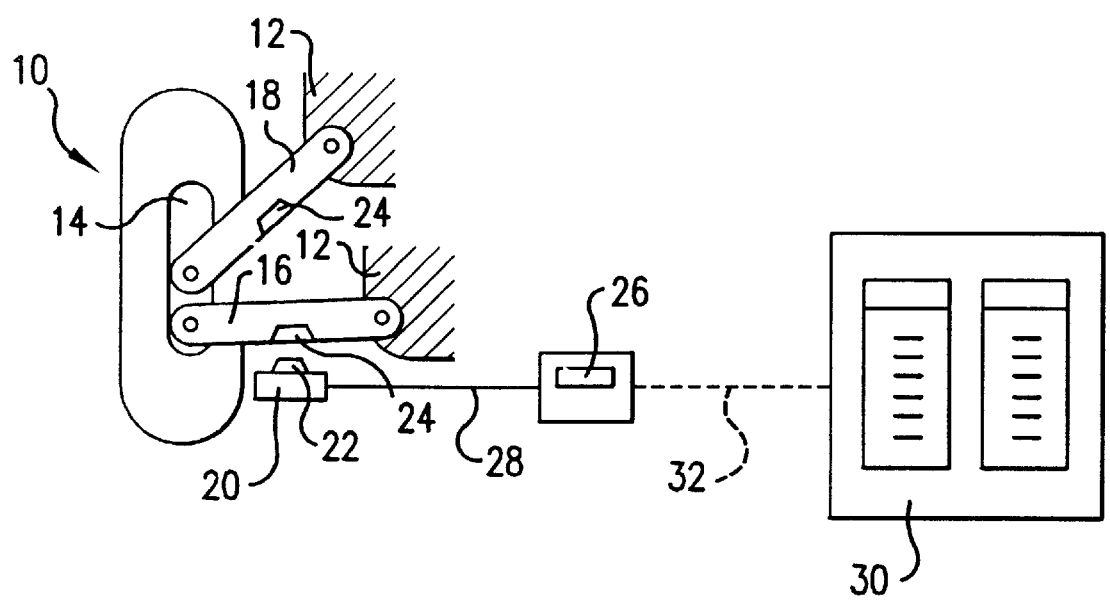
FIG. 1 chematically shows a system for sensing the axle geometry of a motor vehicle according to a preferred embodiment of the present invention.

FIG. 1 schematically shows a system for implementing the method of the present invention. A wheel 10 is linked to a vehicle body 12 via a wheel carrier 14 and suspension links

16, 18. The suspension links 16, 18 are rotatably coupled to each of the wheel carrier 14 and the vehicle body 12. An electronic inclination-measuring device 20 is provided for measuring the angle of inclination of the suspension links. The electronic inclination-measuring device 20 includes a sensor which is integrated in a housing and indicates a measured deviation from the horizontal or vertical in angular degrees. The sensor may be, for example, magnetoresistive, conductometric, piezoelectric or optical. An outer contour of the housing is designed to be adapted to the suspension links. In the illustrated embodiment, the housing includes a truncated pyramid portion 22 which is configured to be received in recesses 24 in the suspension links 16, 18.

The angle of inclination determined by the sensor of the measuring device 20 is presented or output optically or acoustically on an indicating device 26. The indicating device may be arranged on the sensor housing or as illustrated may be a separate unit connected to the measuring device 20 via an electronic communication line 28. The person operating the inclination-measuring device 20 can check the plausibility of the measurement in situ on the basis of the angle of inclination output by the indicating device 26 and, if need be, can repeat the measurement.

For sensing the measured values, the truncated pyramid portion 22 of the inclination-measuring device 20 is placed in the recesses 24 in the suspension links 16, 18. The sensor measures a value of the inclination of the suspension links, which is output on the indicating device 26 and is transmitted to a downstream computer 30, for example via a data line 32 or wirelessly. The computer 30 includes memory for storing the measured values of inclination of the suspension links, as well as memory for storing vehicle-type-specific data. The computer 30 includes a processor for calculating the level of the wheel suspension, based on the measured values of inclination of wheel suspension links and the vehicle-type-specific data. The processor is also able to calculate a zero or neutral position of the wheel or the wheel suspension., as well as level-dependent characteristic axle values including camber, caster and toe-in.

The computer 30 compares the measured values of inclination of the suspension links with setpoint values or setpoint value ranges prescribed by the vehicle manufacturer, and generates correction values for correctly aligning the suspension.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Method of determining at least one of toe-in, camber and caster on a motor vehicle having a plurality of vehicle wheels mounted on respective independent wheel suspension units, each of which includes a plurality of suspension links which support one of said wheels on a body of said motor vehicle, with measured values being sensed by measuring techniques and sent to a computer, wherein:

inclination is measured for respective wheel suspension links of at least one of the respective wheel suspension units, independently of a level position of the motor vehicle;

measured inclination values are compared with one of vehicle-type-specific setpoint values and setpoint value ranges, adapted in the computer to the currently applicable motor-vehicle position, or measured inclination values are converted in the computer to a neutral motor-vehicle position and compared with the vehicle-type-specific setpoint values or setpoint value ranges based on a neutral motor-vehicle positions; and based on deviations between the measured values and corresponding setpoint values or setpoint value ranges determined during comparison, at least one of a measuring or checking record of the axle geometry and a set of machine-processable alignment data is produced.

2. Method according to claim 1, wherein for each wheel an angle of inclination of a particular link is sensed with the aid of an electronic spirit level.

3. Method according to claim 2, wherein a level is calculated for each wheel based on the measured angle of inclination for links associated with the particular wheel, and on the vehicle-type-specific data on the wheel suspension, in order to offset the wheel with respect to a zero or neutral position.

4. Method according to claim 3, wherein the setpoint values or the setpoint value ranges for certain axle geometries are determined as a function of the vehicle-type-specific data on the wheel suspensions dependent on the level calculated for each wheel or for each axle.

5. Method according to claim 1, wherein the inclination measurements are carried out individually in sequence, group by group in sequence, or approximately simultaneously.

6. Method according to claim 1, wherein the vehicle-type-specific setpoint values or setpoint value ranges of the axle geometry are calculated on the basis of the transmission or are determined experimentally.

7. Method of sensing an axle geometry of a motor vehicle having a plurality of vehicle wheels mounted on respective independent wheel suspension units, each of which includes a plurality of suspension links which support one of said vehicle wheels on a body of said motor vehicle, said method comprising:

measuring inclination values for a plurality of suspension links of at least one of the respective wheel suspension units, independently of a level position of the motor vehicle;

comparing said inclination values with vehicle-type-specific setpoint values or setpoint value ranges to determine deviations therebetween; and determining alignment correction values for said axle geometry based on said deviations.

8. Method according to claim 7, wherein said axle geometry includes at least one of toe-in, camber and caster.

9. Method according to claim 7, wherein said measuring step further comprises measuring an inclination value for at least one specific location of the vehicle body, independently of the level position of the motor vehicle.

10. Method according to claim 9, wherein in said comparing step, said inclination values are compared with the vehicle-type-specific setpoint values or setpoint value ranges adapted in the computer to the currently applicable motor-vehicle position.

11. Method according to claim 9, wherein in said comparing step, said inclination values are converted in the computer to a neutral motor-vehicle position and compared with the vehicle-type-specific values or setpoint value ranges based on the neutral motor-vehicle position.

12. Method according to claim 7, wherein said measuring step is effected via an electronic spirit level.

13. Method according to claim 12, wherein for each particular wheel a level is calculated from a measured angle of inclination for suspension links associated with the particular wheel, and from the vehicle-type-specific data on the wheel suspension, in order to offset the wheel with respect to a zero or neutral position.

14. Method according to claim 13, wherein the setpoint values or setpoint value ranges for certain axle geometries are determined as a function of the vehicle-type-specific data on the wheel suspensions in dependence on the level calculated for each wheel or for each axle.

15. Method according to claim 7, wherein the inclination measurements are carried out individually in sequence, sequentially in groups, or approximately simultaneously.

16. Method according to claim 7, wherein the vehicle-type-specific setpoint values or setpoint value ranges of the axle geometry are calculated on the basis of the transmission or are determined experimentally.

* * * * *